United States Patent [19]

Herrmann et al.

[11] 4,100,983
[45] Jul. 18, 1978

[54] BORING DEVICE

[75] Inventors: Lothar Herrmann, Metzingen; Gotthold Schur, Riederich, both of Fed. Rep. of Germany

[73] Assignee: Firma Botek Praezisions-Bohrtechnik Schur & Co., Riederich, Fed. Rep. of Germany

[21] Appl. No.: 684,979

[22] Filed: May 10, 1976

[30] Foreign Application Priority Data

May 22, 1975 [DE] Fed. Rep. of Germany ....... 2522565
Dec. 18, 1975 [DE] Fed. Rep. of Germany ....... 2556943

[51] Int. Cl.² .............................................. E21B 9/00
[52] U.S. Cl. .................................. 175/383; 175/384; 408/162
[58] Field of Search ............... 175/202, 272, 273, 383, 175/384; 408/81, 144, 153, 158, 161, 162, 705, 713

[56] References Cited

U.S. PATENT DOCUMENTS

| 1,226,393 | 5/1917 | Skeen ................. 175/384 X |
| 1,366,733 | 1/1921 | Jung ................... 175/384 X |
| 1,468,774 | 9/1923 | Caldwell ............. 175/384 X |
| 3,203,493 | 8/1965 | Bergstrom ............ 175/383 |
| 3,989,115 | 11/1976 | Ambrose .............. 175/384 |

FOREIGN PATENT DOCUMENTS

| 1,225,575 | 9/1966 | Fed. Rep. of Germany ....... 175/382 |
| 2,159,406 | 1/1973 | Fed. Rep. of Germany ....... 175/384 |

Primary Examiner—Ernest R. Purser
Assistant Examiner—Richard E. Favreau

[57] ABSTRACT

A boring device adapted for deep well drilling wherein a cutting plate is fixed in operative position in a recess of a boring head by means of a clamping bolt. The cutting plate is reversible and its position in the boring head is adapted to be adjusted in a substantially radial direction. The cutting plate has a serrated surface and the bottom of the recess has a matingly serrated surface which when contacting each other enhance the clamping action of the clamping bolt.

8 Claims, 7 Drawing Figures

BORING DEVICE

BACKGROUND OF THE INVENTION

This invention relates to a deep well boring device having a boring head having at least one screwed on cutting plate and an exterior guide strip.

Boring heads having a screwed on cutting plate for deep well drills are already known. Such boring heads may be cooled by a cooling medium that is applied exteriorly and may have an internal passage for removing the bores and chips. There are also known deep well drills having interior cooling means and passages on the exterior surface thereof for removing the chips, shavings, cuttings etc. In such tools it is unavoidable to sharpen the tool, after the cutting plate has been exchanged, so that the cutting edge on the cutting plate is sharpened along the circumference of the guiding strip. In practice, this means that an exchange of the cutting plate is practically not possible and therefore a certain number of cutting plates must be prepared for each deep well bore head and must be roundly sharpened with it. An exchange of plates from one bore head to the other is practically not possible.

SUMMARY OF THE INVENTION

It is a principal object of this invention to provide a deep well tool or drill which has reversible cutting plates which can be precisely adjusted and do not require to be sharpened along the peripheral circle of the guide strip so that the aforementioned drawbacks of the deep well tools of the state of the art have been eliminated.

The object of the invention is attained by making the cutting plate adjustable primarily in the radial direction. The bearing surface of the cutting plate is stepped and abuts against a correspondingly stepped support surface of the bore head. The stepped contacting surface of the reversible cutting plate and the support surface of the bore head can advantageously be provided with a keyed or serrated portion. The adjustable reversible cutting plates can therefore be precisely adjusted to the desired cutting diameter of the bore head and thus carry out a corresponding boring operation. The cutting plates can be formed as reversible plates where cutting edges are provided at opposite sides of the plate. After one of the cutting edges becomes worn, the plate can be dismounted and turned 180° and again mounted in the bore head. Thereafter the plate can be precisely adjusted to a boring diameter and can be secured in position by being tightly clamped. The precise adjustment to the desired diameter can be advantageously provided by means of a wedge which is positioned between an edge of the reversible cutting plate and a step of the bore head and which is adjustable by means of screwed pins. The arrangement of the invention makes it possible to adjust the reversible cutting plate to a diameter which deviates from the diameter determined by the guide strip. It has been established that, when boring at least certain material, a precisely straight long bore is favored, when the cutting edge of the reversible cutting plate projects a slight distance beyond the exterior surface of the guide strip from the bore head axis.

It is possible to obtain a secure mounting of the reversible plate, that is an avoidance of a displacement thereof during boring, by serrating the supporting surface of the reversible cutting plate and the opposite surface of the bore head which contacts it. Such an arrangement also provides for a secure adjustment of the reversible plate on the bore head. The mounting of the reversible cutting plate can be carried out in standard fashion by means of a clamping screw which extends through a relatively wide opening of the plate and which clamps with its head the plate against the bore head. The reversible cutting plate can advantageously be provided on the side which abuts against the front face of the bore head with an angled portion and with a known chip guiding step and chip distributing step. The guiding strips can be exchangeably mounted in the bore head which can be accomplished by either soldering or screwing in the guide strip. By such measures, the durability and ruggedness of the bore head of this invention is further increased.

BRIEF DESCRIPTION OF THE DRAWING

The invention is further set forth in the following detailed description taken in conjunction with the appended drawing, in which.

DETAILED DESCRIPTION

Figure 2:
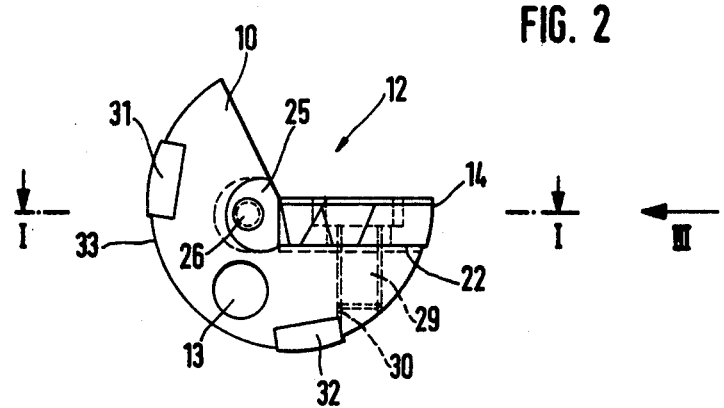
FIG. 2 is an end view of the bore head.
Figure 1:
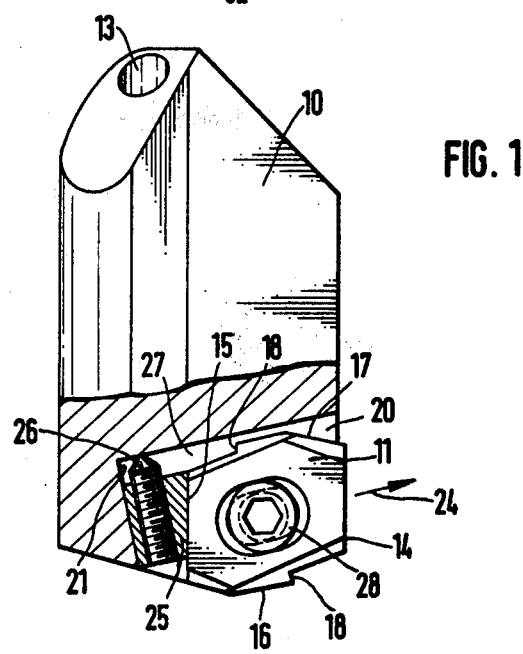
FIG. 1 is a partial side view of a bore head of a uni-lip bore drill, which is partially in section along line I—I of FIG. 2.
Figure 3:
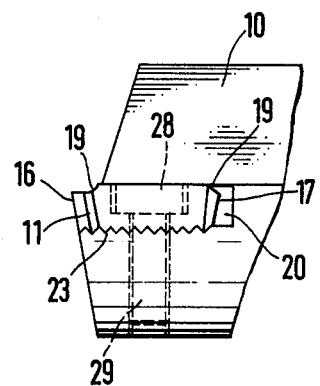
FIG. 3 is a partial side view of the bore head in the direction of the arrow III in FIG. 2.

Referring now to the drawings, and in particular to FIGS. 1 to 3, there is illustrated a uni-lip drill the bore head 10 of which has an adjustable reversible plate 11. As can best be observed in FIG. 1, the bore head 10 has a broad and wedge-shaped exterior groove 12 which serves to remove the chips, borings, turnings, shavings etc. which are swept out by means of a cooling medium that is fed through the longitudinal bore 13 of the bore head.

The reversible cutting plate of the embodiment of FIG. 1 has two cutting edges 14 and 15 which are positioned at opposite sides of the plate 11 and which perform a cutting operation, when correctly positioned, at the periphery of the bore head 10. In addition thereto, the plate 11 has two further cutting edges 16 and 17 which are adapted to carry out a cutting operation at the end face of the bore head and which are disposed angularly in a known manner. The cutting edges 16 and 17 have furthermore a chip distributing step 18 and a further chip distributing step 19 (see FIG. 3).

The reversible cutting plate 11 is arranged in a slot or indentation 20 of the bore head 10, this slot forming stepped edges 21 and 27. The bottom of the indentation 20 forms the supporting surface for the reversible cutting plate 11 in the bore head 10. This bottom of the indentation 20 is provided with a serrated portion 23 (see FIG. 3) the teeth of which extend in the direction of the arrow 24 of FIG. 1, that is primarily in a radial direction relative to the bore heas 10.

The adjustment of the reversible plate 11 in the direction of the arrow 24, which corresponds to the direction of the teeth of the surface 23, is carried out by means of a wedge 25 that extends between the stepped edge 21 of the indentation 20 and the non-operating cutting edge 15 of the reversible cutting plate. The wedge 25 has a bore through which a threaded pin 26 extends and in which it is adjustably mounted. This further pin 26 abuts against the stepped edge 27 of the indentation 20 and makes possible a very precise and fine adjustment of the wedge 25 in the direction of the longitudinal axis of the threaded pin 26. A slidable adjustment of the reversible plate 11 in the direction of the teeth 23 and thereby an adjustment of the diameter of the working peripheral cutting edge 14 of the cutting plate 11 can be effected.

The reversible cutting plate 11 has a central opening through which a clamping bolt or screw 29 having a head 28 extends. This screw 29 is anchored and threaded into a further bore 30 of the bore head 10. The through opening of the reversible cutting plate 11 is selected to be sufficiently large so that by loosening the clamping screw 29 the aforementioned radial adjustment of the cutting plate 11 can be carried out by means of the wedge 25. After this adjustment of the cutting plate 11 has been carried out, the cutting plate 11 is again fixed in position with the aid of the clamping screw 29.

The bore head 10 is provided with two grooves which extend in a longitudinal direction and which are positioned 120° relative to each other around the periphery of the bore head. There are mounted in these grooves two guiding strips 31 and 32 (see FIG. 2) which are preferably exchangeably mounted in the grooves and which extend slightly beyond the periphery 33 of the bore head 10. The reversible cutting plate 11 is adjusted in such a way that it assumes with its working peripheral cutting edge 14 the bore head diameter which is determined by the guiding strips 31 and 32 or a somewhat larger diameter. The clamping screw 29 can be unscrewed or loosened in order to reverse or exchange the reversible cutting plate 11. The wedge 25 is returned to its rest position by turning the screwed pin 26. Thereafter the cutting plate 11 is turned 180° so that the serrated portion 23' of the supporting surface 22 of the reversible cutting plate 11 matingly meshes again with the serrated portion 23 of the bottom of the indentation 20 of the bore head 10 and the cutting edge 15 of the cutting plate 11 thus is positioned at the periphery of the bore head. Thereafter, the cutting edge 15 is adjusted to the desired new diameter for the bore head by means of the wedge 25 and is secured in position after such adjustment by tightening the previously inserted clamping screw 29.

Figure 4:
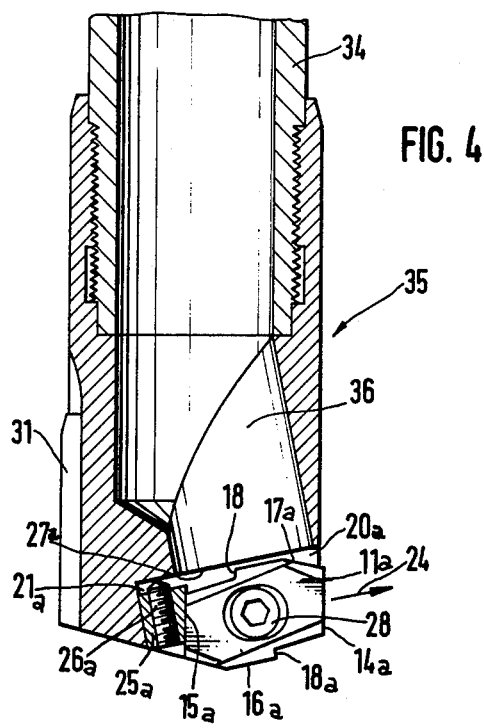
FIG. 4 is a longitudinal sectional view corresponding substantially to the view in FIG. 1 of a second embodiment of a bore head which has means for internally removing chips, turnings, shavings etc.

FIG. 4 illustrates an alternate arrangement of a deep well boring head wherein those parts which are equivalent to the embodiment of FIGS. 1 to 3 have identical reference numerals with the letter "a" added to them. There is illustrated in FIG. 4 an arrangement wherein the reversible cutting plate 11a is mounted in a bore head 35 which has passages for conducting an exterior cooling medium and has an inner passage for removing the chips, turnings, borings, shavings etc. through a chip mouth 36. The bore head 35 is screwed onto a threaded end of a bore pipe 34. The cutting plate 11a is basically mounted in the same manner as in the embodiment of the uni-lip boring device according to FIGS. 1 to 3, and it is for this reason that the equivalent parts have the same reference numeral with the suffix "a" added. The operational characteristics of the arrangement are therefore not described in great detail. The same also holds for the embodiment of FIGS. 5 to 7 where the suffix "b," "c" and "d" are respectively added to the reference numbers.

Figure 5:
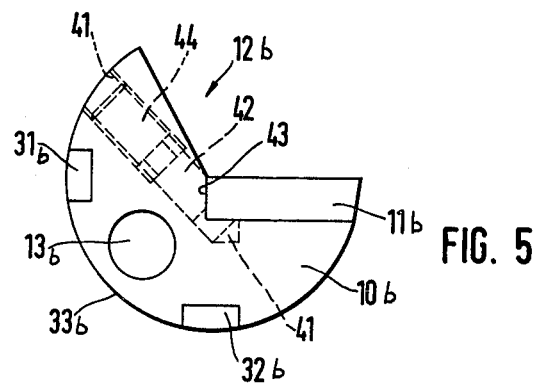
FIG. 5 is an end view of a third embodiment of a bore head having external means for removing the chips, turnings, shavings etc.

In the embodiment of FIG. 5 the radial adjustment of the cutting plate of the bore head 10b of a uni-lip boring device is provided with a transverse bore 41 which extends into the region of the support shoulder of the bore head for the cutting plate 11b. There is slidably mounted within the transverse bore 41 a cylindrical stop 42 which has the form of a stop pin. This pin 42 is adapted to contact an oblique stop by surfaced member 43 which is snugly positioned at the side edge of the reversible cutting plate 11b. The exterior portion of the transverse bore 41 is threaded and an adjusting screw 44 can be screwed into this threaded portion with which the cylindrical stop pin 42 can be moved inwardly for adjusting the position of the cutting plate 11b.

Figure 6:
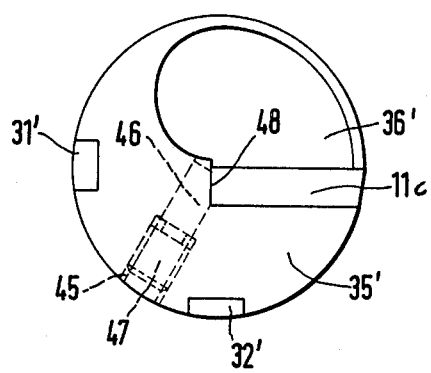
FIG. 6 is an end view of a fourth embodiment of a bore head having internal means for removing the chips, borings, shavings etc.
Figure 7:
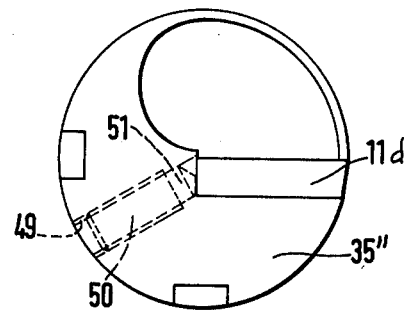
FIG. 7 is an end view of a fourth embodiment of a bore head which also has internal means for removing the chips, turnings, borings, shavings etc.

In the embodiment of FIG. 6 the cutting head 35' has a transverse bore 45 which extends from the chip mouth 36' into the periphery of the bore head 35' that is located between the guiding strips 31' and 32'. The chip mouth 36' serves for removing through an interior passage the chips that are produced by the boring operation. This transverse bore has an exterior threaded portion in which an adjusting screw 47 is threadably mounted. Furthermore, there is provided in the transverse bore 45 a cylindrical stop member 46 which has an inclined stop surface 48 that abuts against the side edge of the cutting plate 11c. In the embodiment of FIG. 7 there is provided a transverse bore 49 which is directed towards the contacting shoulder of the cutting plate 11d, at a more acute angle and which is threaded through its entire axial length. The contacting portion of the cutting disc 11d is directly contacted by a worm screw 50 which contacts the side edge of the cutting plate 11d by means of a foot 51.

In all three embodiments of FIGS. 5 to 7 the cutting discs 11b to 11d have a stepped, non-illustrated, contacting surface and the cutting head is provided with a correspondingly profiled and stepped contacting surface. The contacting surfaces can act in the sense of a groove/spring-connection and thereby provide secure lateral guidance for the reversible cutting plate when the latter is axially adjusted. The stepping feature can, however, as is illustrated in the embodiments of FIGS. 1 to 4, be replaced by a wedge or serration, which also affords a nontilting support and a secure guidance for the reversible cutting plate, even when the contacting parts 42, 46, 50 at the side edge of the cutting plate form only a small stop and support surface for the cutting plate.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. In a boring device adjustable in at least a first radial direction for boring holes of selectable diameter, a bore head having an external recess therein bounded by upper and lower surfaces extending in at least the first direction, at least one of the lower surfaces of the recess having a first pattern of longitudinal indentations extending along the first direction, a cutting plate having first and second opposed surfaces separated by at least third and fourth opposed surfaces, each of the first and second surfaces having cutting edges therein at least one of the third and fourth surfaces having a second pattern of longitudinal indentations complementary to and interfitting with the first pattern of indentations on the lower surface of the recess whereby said lower surface provides a guideway for the radial adjustment of the cutting plate when the cutting plate is positioned within the recess, the cutting plate further having an elongated central slot extending substantially parallel to the third and fourth surfaces of the cutting plate, and releasable securing means cooperable with the slot in the cutting plate for reversibly supporting the cutting plate in the recess with a selected one of the third and fourth surfaces thereof contacting the lower surface of the recess.

2. The boring device as defined in claim 1, including an adjusting bolt movably mounted in said bore head and having an end portion, said bore head having a recess, said cutting plate being at least partially operatively mounted in said recess, said end portion of said adjusting bolt being adapted to project into said recess and contact said cutting plate to thereby adjust its position.

3. The bore device as defined in claim 2, wherein said adjusting bolt is threadably mounted in said bore head and has an end portion adapted to contact said cutting plate.

4. The boring device as defined in claim 2, wherein said adjusting bolt is formed by a threaded portion which is threadably mounted in said bore head and cylindrical portion having an oblique surface adapted to contact said cutting plate.

5. A boring device comprising, in combination, a boring head having a stepped supporting surface and a recess with side walls, a reversible cutting plate adjustably mounted in the recess of the boring head and adapted to be adjusted in at least a radial direction, the cutting plate being at least partially operatively mounted in the recess of the bore head, the cutting plate having side walls and a stepped bearing surface which contacts the stepped supporting surface of the boring head when the cutting plate is operatively mounted in the boring head, a wedge mounted between and contacting one of the side walls of the recess in the boring head and one of the side walls of the cutting plate, the wedge having a threaded bore, and a threaded pin mounted in and extending through the bore in the wedge and adapted to contact another of the side walls of the recess, whereby the position of the cutting plate in the recess is adjusted by threadably moving the threaded pin against the other side wall of the recess.

6. The boring device as defined in claim 5, wherein said stepped surfaces are serrated.

7. The boring device as defined in claim 5, wherein said cutting plate has at least two cutting edges at opposite sides of said cutting plate, at least two guide strips removably mounted on the periphery of said bore head, the operative one of said cutting edges having a radial extent slightly larger than the radial extent of said guide strips.

8. The boring device as defined in claim 5, wherein said boring head has an end face, said cutting plate has an angled cutting edge which is substantially disposed in said end face, said angled cutting edge having a first step for guiding chips and a second step for distributing chips.

* * * * *